US005515593A

United States Patent [19]

Eagler

[11] Patent Number: 5,515,593

[45] Date of Patent: May 14, 1996

[54] NOZZLE CADDY

[75] Inventor: James O. Eagler, Gosport, Ind.

[73] Assignee: Oil Equipment Supply Corp., Indianapolis, Ind.

[21] Appl. No.: 277,906

[22] Filed: Jul. 20, 1994

[51] Int. Cl.$^6$ .............................. B23P 19/00; B25B 27/00

[52] U.S. Cl. .................. 29/426.5; 29/402.03; 29/402.08; 29/281.1; 141/392

[58] Field of Search ................................ 29/426.1, 426.5, 29/402.03, 402.08, 281.1; 269/289 R; 141/392; 248/75, 76, 79, 544

[56] References Cited

U.S. PATENT DOCUMENTS

| | | | |
|---|---|---|---|
| 2,900,111 | 8/1959 | Scheurer . | |
| 4,236,733 | 12/1980 | Zambrano | 248/75 X |
| 4,240,475 | 12/1980 | Schulz . | |
| 4,331,190 | 5/1982 | Sutcliffe et al. . | |
| 4,956,905 | 9/1990 | Davidson | 29/281.1 |
| 4,979,703 | 12/1990 | Fleming . | |
| 5,297,339 | 3/1994 | Morgenstern et al. | 29/281.1 |

*Primary Examiner*—S. Thomas Hughes
*Attorney, Agent, or Firm*—Woodward, Emhardt, Naughton, Moriarty & McNett

[57] ABSTRACT

A holding fixture to facilitate removing a fuel-dispensing nozzle assembly, optionally including a swivel or breakaway device, from a hose includes one or more stabilizing supports to hold the nozzle assembly in a predetermined orientation and a basin member to contain fuel spilled from the nozzle assembly and/or the hose during the changeout procedure. A knee rest to allow the mechanic to use his body weight to pin the holding fixture to the ground is also preferably included.

The stabilizing supports preferably include a spout stabilizer to hold the nozzle spout in a predetermined orientation, and a body stabilizer to hold the nozzle assembly body. A base member to assist in stabilizing the holding fixture during the changeout procedure, and a stabilizer to hold the swivel and/or breakaway device and/or the fuel hose in a predetermined orientation may also be included. Finally, the fixture may be adapted to include two sets of stabilizing members so that the new and old nozzle assemblies may be simultaneously stabilized.

17 Claims, 2 Drawing Sheets

NOZZLE CADDY

FIELD OF THE INVENTION

The present invention relates generally to devices to facilitate the changing of fuel-dispensing nozzle assemblies, and more particularly to a holding fixture specifically adapted for such use.

BACKGROUND TO THE INVENTION

Hoses having fuel-dispensing nozzle assemblies attached thereto have long been used to dispense fuel to vehicles. In general, the hoses are about 1" in diameter, and are typically about 10 feet in length. The nozzle assemblies commonly include a handle, a body portion, a trigger with a trigger guard, and a spout. The nozzle assembly is attached to the hose directly with a threaded coupling or to a threaded swivel and/or breakaway device so that the nozzle assembly may be removed from the hose. For convenience, the term "nozzle assembly" shall hereinafter refer to fuel-dispensing nozzle assemblies including or excluding swivels and/or breakaway devices.

As dirt and grime accumulate in such nozzle assemblies, or as the nozzle assembly becomes subject to metal fatigue and mechanical failure, it is often necessary to change the nozzle assembly without removing the hose from the pump. Because the nozzle assemblies are snugly coupled to assure that fuel does not leak from the hose, the removal of the nozzle requires the use of a wrench. Accordingly, the hose and nozzle assembly must generally be substantially stabilized during the nozzle assembly changeout procedure, so that the coupling may be effectively wrenched loose.

Holding fixtures to facilitate the changing of fuel-dispensing nozzle assemblies are unknown to the art. Therefore, it has been necessary for a person to wrestle with the hose, perhaps wrapping it around a leg, to stabilize the hose while wrenching the nozzle assembly from the end. This technique is less than elegant, and inevitably the fuel contained in the hose spills on the ground and/or soils the mechanic's clothes.

A need therefore exists for a holding fixture to facilitate the changing of fuel-dispensing nozzle assemblies at a fuel pump. The present invention addresses that need.

SUMMARY OF THE INVENTION

Briefly describing the present invention there is provided a holding fixture to facilitate removing a fuel-dispensing nozzle assembly from a hose. Most commonly, the fuel-dispensing nozzle assembly includes a handle, a body portion, a trigger, a trigger-guard and a spout. As indicated above, swivels or breakaway devices may also be included. The holding fixture generally includes one or more stabilizing members to hold the nozzle assembly in a predetermined orientation, and a basin member to contain fuel spilled from the nozzle assembly and/or the hose during the changeout procedure. A knee rest to allow the mechanic to use his body weight to pin the holding fixture to the ground during use is also preferably included.

The stabilizing members of the present invention preferably comprise a spout stabilizing member to hold the nozzle spout in a predetermined orientation, and a body stabilizing member to hold the nozzle assembly body. A base member to assist in stabilizing the holding fixture during the changeout procedure, and a hose stabilizing member to hold the fuel hose in a predetermined orientation may also be included. Finally, the fixture may be adapted to include two sets of stabilizing members so that the new and old nozzle assemblies may be simultaneously accommodated.

One object of the present invention is to provide a holding fixture to facilitate removing a fuel-dispensing nozzle assembly, optionally including a swivel or breakaway device, from a hose. Further objects and advantages of the present invention will be apparent from the following description.

DESCRIPTION OF THE PREFERRED EMBODIMENT

Figure 1:
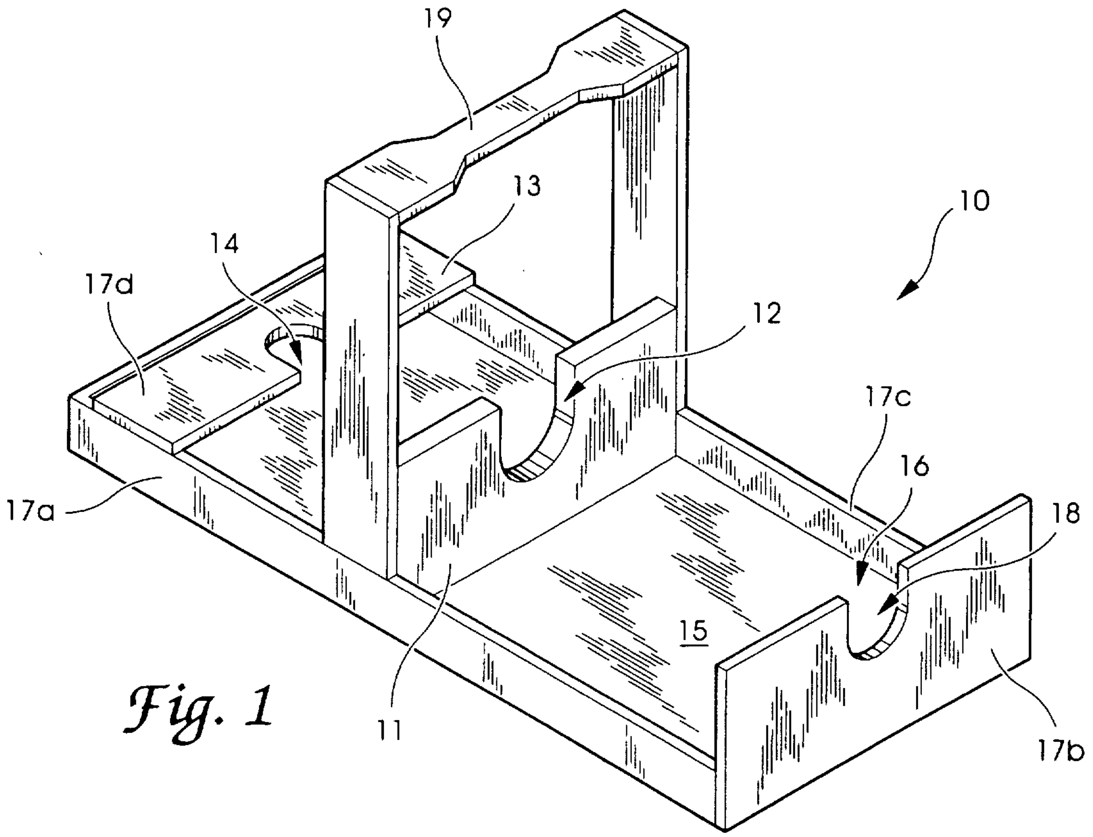
FIG. 1 is a perspective view of the nozzle caddy of the present invention, according to one preferred embodiment.
Figure 2:
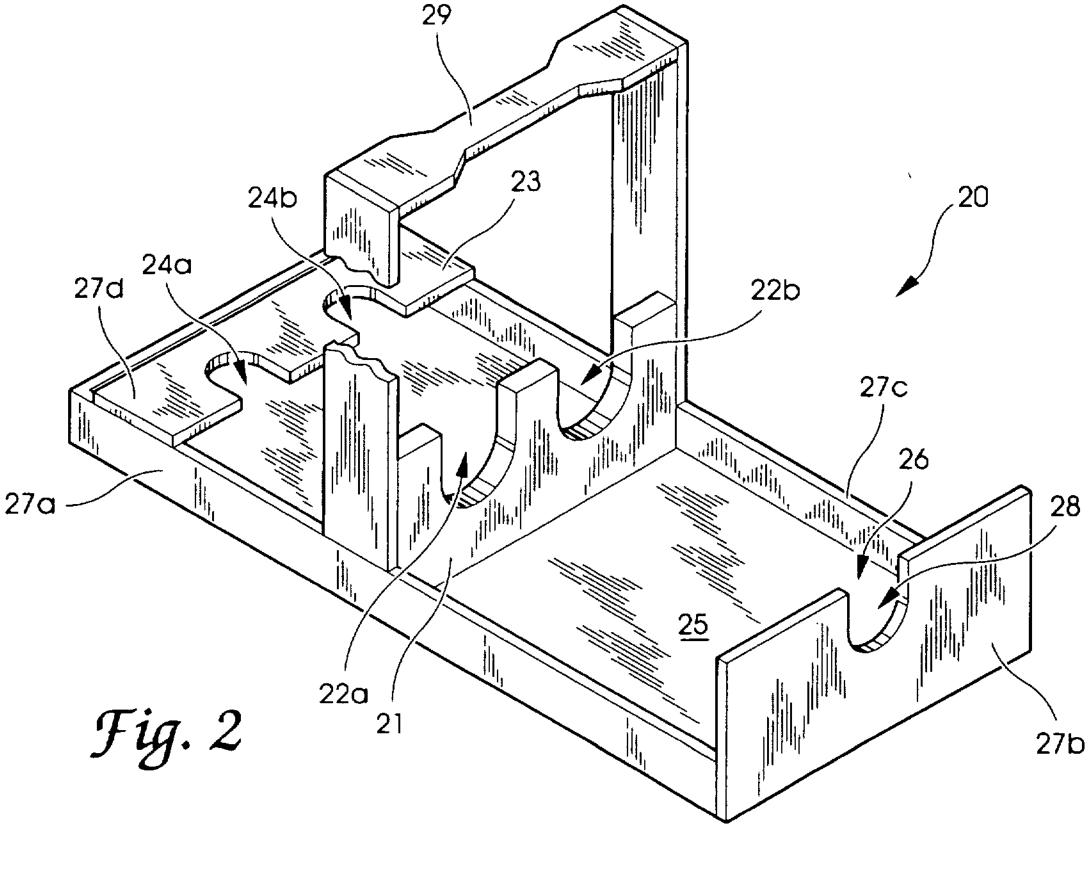
FIG. 2 is a perspective view of a double nozzle caddy, according to one preferred embodiment.
Figure 3:
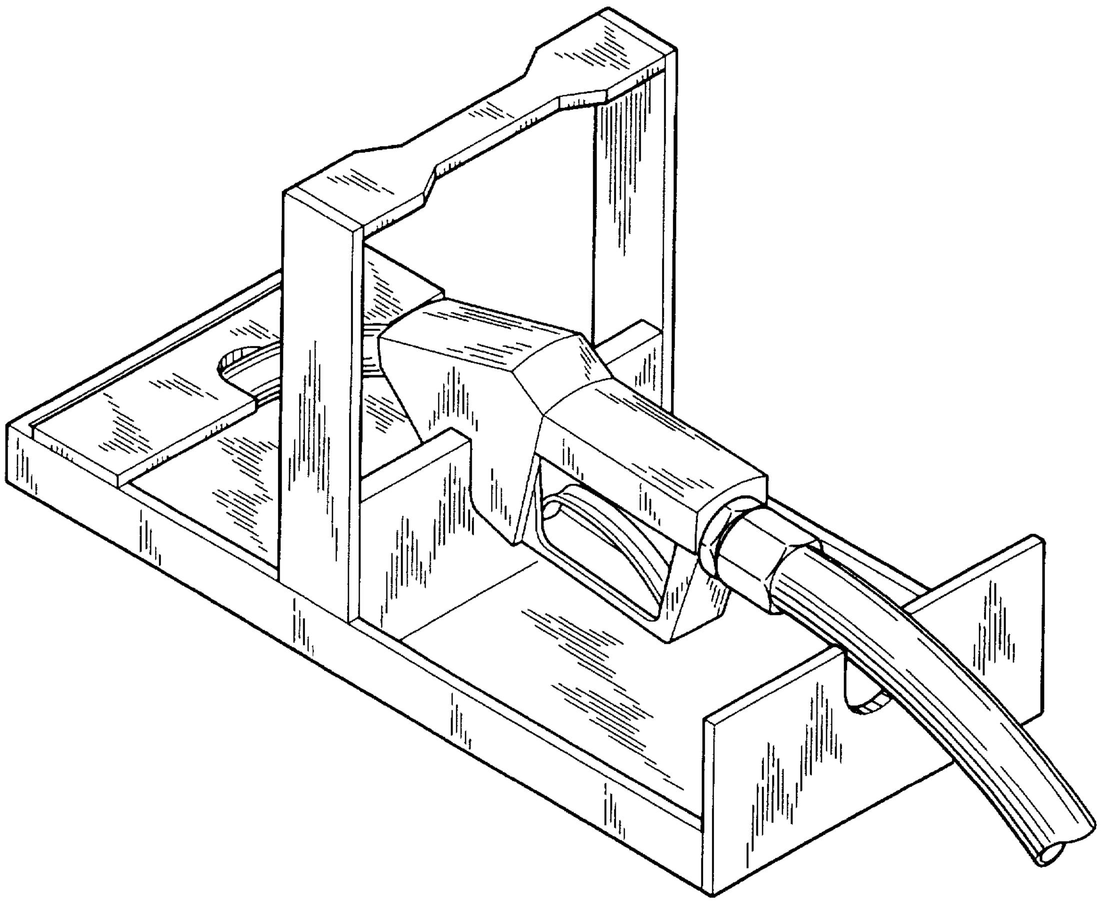
FIG. 3 is a perspective view of the nozzle caddy of FIG. 1 in use, with a nozzle assembly positioned in the caddy.

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

The present invention relates generally to devices for removing fuel-dispensing nozzle assemblies, optionally including swivels and/or breakaway devices, from gas pump hoses. As indicated above, in one preferred embodiment the holding fixture includes a stabilizing member to hold the nozzle assembly in a predetermined orientation, and a basin member to contain fuel spilled from the nozzle and/or the hose during the changeout procedure. A knee rest to allow the mechanic to use his body weight to pin the holding fixture to the ground is also preferably included.

The stabilizing member to hold the nozzle assembly in a predetermined orientation may be provided in one or several pieces. In one aspect of the invention, a single support having a U-shaped notch to receive the nozzle assembly is provided. The notch opens upward when the nozzle caddy is laid on the ground to receive a nozzle assembly, and is sized to accommodate a conventional fuel-dispensing nozzle assembly. The first stabilizing member is intended to stabilize the nozzle assembly while the nozzle assembly is being wrenched from the hose, and accordingly is designed to resist any lateral and torquing movement of the nozzle assembly.

In another aspect of the invention a second stabilizing member is included. Preferably, the second stabilizing member is adapted to hold the nozzle assembly spout in a predetermined orientation, while the first stabilizing member holds the nozzle assembly body. In a manner similar to the first stabilizing member, the second stabilizing member is intended to stabilize the spout while the nozzle assembly is being wrenched from the hose, and accordingly is designed to resist any lateral and torquing movement of the spout.

A basin to contain fuel spilled from the nozzle and/or the hose during the changeout procedure is also included. In preferred embodiments the basin also provides a base member to stabilize the holding fixture when the fixture is laid on the ground.

Additionally, the holding fixture may include a member to stabilize the hose while the nozzle assembly is being removed. Normally, the hose stabilizing member is a support similar to the nozzle assembly body support, with a U-shaped notch sized to receive the hose.

Means for assisting the mechanic in pinning the holding fixture to the ground while removing a nozzle assembly is also preferably included. In one preferred embodiment said pinning means is a knee rest or a foot rest integral with the nozzle assembly body support. Alternatively, the pinning means may be attached to the base member, or to the basin of the holding fixture.

In another preferred embodiment the holding fixture includes a second set of stabilizing members so that two nozzle assemblies may be accommodated simultaneously. The dual stabilizer embodiment allows the mechanic to remove a first nozzle assembly and install a second nozzle assembly while the first assembly remains in the caddy.

Referring now to the drawings, nozzle caddy 10 includes a stabilizing member 11 including a U-shaped notch 12 sized to receive a fuel-dispensing nozzle assembly. Stabilizing member 11 is generally planar, and is normal to the ground with the U-shaped notch opening upward when the nozzle caddy is laid on the floor.

Second stabilizing member 13 is provided to stabilize the nozzle spout. The second stabilizing member is also generally planar, but is parallel to the ground when the nozzle caddy is laid on the floor. U-shaped notch 14 in second stabilizing member 13 opens rearward toward stabilizing member 11, and is adapted to receive and stabilize the nozzle assembly spout.

Base member 15 provides a stabilizing surface for the nozzle caddy, and also assists in defining the basin to contain fuel spilled from the nozzle and/or the hose during the changeout procedure. Basin 16 is further defined by basin walls 17*a*, 17*b*, 17*c* and 17*d*.

Basin wall 17*b* may also include a U-shaped notch 18 to receive and stabilize the fuel hose and/or breakaway device and/or the swivel while the nozzle assembly is being changed. Like U-shaped notch 12, U-shaped notch 18 opens upward to receive the swivel (if present), and/or the breakaway device (if present) or the hose Knee rest 19 for assisting the mechanic in pinning the holding fixture to the ground while removing a nozzle assembly is also preferably included. As noted above, knee rest 19 is integral with stabilizing member 11, and also provides a handle to assist in transporting the device.

Dual nozzle caddy 20 is adapted to stabilize two nozzle assemblies simultaneously, so that a first nozzle assembly may be detached and the second nozzle assembly may be installed without removing the first nozzle from the caddy. Accordingly, dual nozzle caddy 20 includes s stabilizing member 21 including two U-shaped notches 22*a* and 22*b* sized to receive fuel-dispensing nozzle assembly. Again, stabilizing member 21 is preferably normal to the ground with the U-shaped notch opening upward when the nozzle caddy is laid on the floor.

Second stabilizing member 23 is provided to stabilize the two nozzle assembly spouts. U-shaped notches 24*a* and 24*b* in second stabilizing member 23 open rearward toward stabilizing member 21, and are adapted to receive and stabilize the nozzle assembly spout.

Base member 25 again provides a stabilizing surface for the nozzle caddy, and also assists in defining the basin to contain fuel spilled from the nozzle assembly and/or the hose during the changeout procedure. Basin 26 is defined by basin walls 27*a*, 27*b*, 27*c* and 27*d*. Basin wall 27*b* may also include a U-shaped notch 28 to receive and stabilize the fuel hose while the nozzle assembly is being changed.

Knee rest 29 or assisting the mechanic in pinning the holding fixture to the ground while removing a nozzle assembly is also preferably included. Knee rest 29 may again be integral with stabilizing member 21, and may also provide a handle to assist in transporting the device.

In use, the nozzle assembly is positioned in the caddy by placing the spout in stabilizing support notch 14 and the nozzle assembly body in stabilizing support notch 12. The swivel, breakaway device or hose may be positioned in hose stabilizing notch 18 if desired. A right-handed mechanic will normally orient the nozzle assembly so that the spout is to his left, and will place his left knee on knee rest 19 to pin the nozzle caddy to the ground. The mechanic's left hand is free to grasp the top of the nozzle assembly body or handle while his right hand wrenches the nozzle assembly from the hose. Gas draining from the hose and/or nozzle assembly is contained by the caddy, and may be disposed of safely at the mechanic's convenience.

If a double nozzle caddy is being used, the hose is then moved to the second nozzle assembly and that assembly is quickly and easily installed. The first nozzle assembly may be left in the caddy to drain, and may be cleaned or repaired when the assembly is dry.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

What is claimed is:

1. A holding fixture to facilitate removing a fuel-dispensing nozzle assembly from a hose, wherein the fuel-dispensing nozzle assembly has a handle, a body portion and a spout; said holding fixture comprising:

(a) a nozzle assembly stabilizing member to hold the nozzle assembly in a predetermined orientation; and (b) a basin member to contain fuel spilled from the nozzle assembly and/or the hose during a changeout procedure.

2. A holding fixture according to claim 1, and including a knee rest to assist a mechanic in using his body weight to pin the holding fixture to the ground while in use.

3. A holding fixture according to claim 1, wherein the nozzle assembly stabilizing member comprises a spout stabilizing member to assist in holding the nozzle assembly spout in a predetermined orientation.

4. A holding fixture according to claim 1, including a base member to stabilize the holding fixture during the changeout procedure.

5. A holding fixture according to claim 1, and further including a hose stabilizing member to assist in holding the fuel hose and/or swivel and/or breakaway device in a predetermined orientation.

6. A holding fixture according to claim 1, and further including a handle member for carrying the holding fixture.

7. A device to facilitate the changing of fuel-dispensing nozzle assemblies comprising:

(a) means for holding a first fuel nozzle assembly in a substantially stabilized position while the nozzle assembly is being detached from a hose; and (b) means for containing fuel which spills from the nozzle assembly and/or hose during a changeout procedure.

8. A device according to claim 7, and including a knee rest to assist a mechanic in using his body weight to pin the holding fixture to the ground while in use.

9. A device according to claim 7, and further including means for holding a second fuel nozzle assembly in a substantially stabilized position while the second nozzle assembly is being attached to a hose.

10. A device according to claim 7 and adapted to accommodate a nozzle assembly having a handle, a body portion and a spout; wherein said means for holding a first fuel nozzle assembly comprises:

a) means for substantially stabilizing the spout of the nozzle assembly; and (b) means for substantially stabilizing the body portion of the nozzle assembly.

11. A device according to claim 10 wherein said means for substantially stabilizing the nozzle assembly spout comprises means for restricting the lateral and torquing motion of the nozzle assembly spout.

12. A device according to claim 11 wherein said means for restricting the lateral and torquing motion of the nozzle assembly spout comprises a notch sized to receive an end of the nozzle assembly.

13. A device according to claim 10 wherein said means for substantially stabilizing the body portion of the nozzle assembly comprises means for restricting the lateral and torquing motion of the body portion of the nozzle assembly.

14. A device according to claim 13 wherein said means for restricting the and torquing motion of the body portion to of the nozzle assembly comprises a support member notched to hold the body of the nozzle assembly.

15. A method for removing components from a fuel dispensing hose, comprising the steps of:

(a) providing a fuel dispensing hose having a component attached thereto;

(b) providing a holding fixture including:

(i) means for holding the component in a stabilized position, and (ii) means for containing fuel which spills from the hose during a changeout procedure;

(c) stabilizing the component in the holding fixture so that any fuel which spills from the hose will be contained by the fuel containing means; and (d) wrenching the component from the hose.

16. A method according to claim 15, wherein said holding fixture includes a knee rest to assist a mechanic in using his body weight to pin the holding fixture to the ground, and wherein said method includes the step of using the knee rest to stabilize the holding fixture while wrenching the nozzle assembly from the hose.

17. A method according to claim 15, wherein said component is a nozzle assembly or a swivel arm breakaway device.

* * * * *

UNITED STATES PATENT AND TRADEMARK OFFICE

CERTIFICATE OF CORRECTION

PATENT NO. : 5,515,593

DATED : May 14, 1996

INVENTOR(S) : James, O. Eagler

It is certified that error appears in the above-indentified patent and that said Letters Patent is hereby corrected as shown below:

Column 2,

Title page, item [75], Attorney, Agent or Firm: change "Woodward" to --Woodard--.

In col. 3, line 48, please insert a period after "hose".

In col. 3, line 59, please change "s" to --a--.

In col. 4, line 10, please change "or" to --for--.

In col. 6, line 2, please insert --lateral-- before "and".

In col. 6, line 2, please delete "to".

Signed and Sealed this

Thirtieth Day of July, 1996

*Attest:*

Bruce Lehman

BRUCE LEHMAN

*Attesting Officer*

*Commissioner of Patents and Trademarks*